United States Patent
Kim et al.

(10) Patent No.: US 9,069,090 B1
(45) Date of Patent: Jun. 30, 2015

(54) APPARATUS AND METHOD OF DETERMINING OPTIMAL ENERGY WINDOW FOR OPTIMAL POSITRON EMISSION TOMOGRAPHY

(71) Applicant: KOREA INSTITUTE OF RADIOLOGICAL & MEDICAL SCIENCES, Seoul (KR)

(72) Inventors: Jin Su Kim, Seoul (KR); A Ram Yu, Seoul (KR); Hee-Joung Kim, Wonju-si (KR); Sang-Moo Lim, Seoul (KR); Kyeong Min Kim, Seoul (KR); Gwang Il An, Seoul (KR)

(73) Assignee: KOREA INSTITUTE OF RADIOLOGICAL & MEDICAL SCIENCES, Seoul (KR)

( * ) Notice: Subject to any disclaimer, the term of this patent is extended or adjusted under 35 U.S.C. 154(b) by 0 days.

(21) Appl. No.: 14/219,521

(22) Filed: Mar. 19, 2014

(30) Foreign Application Priority Data

Dec. 26, 2013 (KR) .......................... 10-2013-0163677

(51) Int. Cl.
 *G01T 1/164* (2006.01)
 *G01T 1/29* (2006.01)

(52) U.S. Cl.
 CPC .................................... *G01T 1/2985* (2013.01)

(58) Field of Classification Search
 CPC ........ G01T 1/164; G01T 1/166; G01T 1/2985
 USPC .............................. 250/252.1, 363.03, 363.09
 See application file for complete search history.

(56) References Cited

FOREIGN PATENT DOCUMENTS

JP 2008-525054 A 7/2008

OTHER PUBLICATIONS

N. Anizan, T. Carlier, C. Hindorf, J. Barbet, BArdes, M. "Acquisition setting optimization and quantitative imaging for 124I studies with the Inveon micro-PET-CT system", EJNMMI Research Feb. 13, 2012, 2:7.*
A Ram Yu, et al. "Effect of single gamma correction for determination of optimal 124I PET acquisition setting based on image characteristics." 2013 Institute of Electrical and Electronics Engineers NSS/MIC/RTSD. Seoul, Republic of Korea (Oct. 27, 2013).
A Ram Yu, et al. "Optimal acquisition setting for I-124 PET based on image characteristics of reconstructed PET" J Nucl Med. 2013; 54 (Supplement 2): 2058. 2013 Society of Nuclear Medicine and Molecular Imaging Annual Meeting. Vancouver, BC, Canada (Jun. 8, 2013).

* cited by examiner

*Primary Examiner* — David Porta
*Assistant Examiner* — Meenakshi Sahu
(74) *Attorney, Agent, or Firm* — Novick, Kim & Lee, PLLC; Sang Ho Lee

(57) ABSTRACT

An apparatus and method for determining an optimal energy window for optimal positron emission tomography (PET) is disclosed. An optimal energy window determining apparatus may include a data corrector configured to correct data measured from an image quality phantom, an image quality measurer configured to measure an image quality for the corrected data, and an optimal energy window determiner configured to determine the optimal energy window based on the measured image quality. The data corrector may correct the measured data based on a difference between sensitivities measured using different radiopharmaceuticals in at least one energy window.

13 Claims, 14 Drawing Sheets

200

| Energy window (keV) | Sensitivity | | SGF⁺ |
|---|---|---|---|
| | $^{124}$I(%) | $^{18}$F(%) | |
| 350~550 | 1.57 (6.83)* | 6.44 (6.64) | 0.03 |
| 350~600 | 1.78 (7.74) | 6.51 (6.71) | 0.13 |
| 350~650 | 1.04 (8.87) | 6.54 (6.74) | 0.24 |
| 350~750 | 2.26 (9.83) | 6.61 (6.81) | 0.31 |
| 390~550 | 1.09 (4.74) | 5.04 (5.20) | 0 |
| 400~590 | 1.31 (5.68) | 5.43 (5.59) | 0.02 |

*The branching ratio-corrected sensitivity is listed in parentheses
Branching ratio ( $^{124}$I : 0.23 and $^{18}$F : 0.97 )
⁺Single gamma photon fraction of $^{124}$I

FOM values in 6 energy windows

| | AC* | AC&SC† | AC&SC&SGF‡ |
|---|---|---|---|
| 350~550 | 117.04 | 98.96 | 95.38 |
| 350~600 | 106.95 | 91.80 | 88.76 |
| 350~650 | 112.23 | 97.22 | 93.64 |
| 350~750 | 86.98 | 70.65 | 64.64 |
| 390~550 | 112.92 | 96.08 | 94.14 |
| 400~590 | 104.11 | 88.83 | 86.28 |

*Attenuation correction
†Scatter correction
‡Single gamma photon correction

APPARATUS AND METHOD OF DETERMINING OPTIMAL ENERGY WINDOW FOR OPTIMAL POSITRON EMISSION TOMOGRAPHY

CROSS-REFERENCE TO RELATED APPLICATION

This application claims the priority benefit of Korean Patent Application No. 10-2013-0163677, filed on Dec. 26, 2013, in the Korean Intellectual Property Office, the disclosure of which is incorporated herein by reference.

BACKGROUND

1. Field of the Invention

The present invention relates to a technology for determining an optimal energy window to determine settings for optimal positron emission tomography (PET).

2. Description of the Related Art

Positron emission tomography (PET) refers to one of nuclear medicine test technologies for injecting, into a human body, radiopharmaceuticals emitting positrons and reconfiguring, using an exclusive scanner, a shape of the injected radiopharmaceuticals used in the human body.

In general, such PET has been adopted to diagnose various types of cancers and also has been known as an efficient test to perform a differential diagnosis on a cancer, clinical staging, an evaluation of recurrence, and a determination as to the treatment effect. In addition, a receptor image or a metabolic image used for evaluating heart disease, brain disease, and brain functions may be acquired using the PET.

Positrons may be emitted from radioactive isotopes, such as, C-11, N-13, O-15, and F-18, as a kind of radiation. The radioactive isotopes correspond to principal constituent components of a biomaterial and thus, radiopharmaceuticals, that is, a tracer for applying a predetermined change in physiological, chemical, and functional views may be produced using the radioactive isotopes.

SUMMARY

An embodiment provides an apparatus for determining an optimal energy window in positron emission tomography (PET), the apparatus including a data corrector configured to correct data measured from an image quality phantom, an image quality measurer configured to measure an image quality for the corrected data, and an optimal energy window determiner configured to determine the optimal energy window based on the measured image quality. The data corrector may correct the measured data based on a difference between sensitivities measured using different radiopharmaceuticals in at least one energy window.

The data corrector may correct the measured data by calculating a ratio of a first sensitivity to a difference value between the first sensitivity measured using a first radiopharmaceutical and a second sensitivity measured using a second radiopharmaceutical.

The data corrector may correct the measured data by subtracting, from the measured data, a value in which the calculated ratio is applied to a scatter component corresponding to the measured data.

The image quality measurer may measure at least one of non-uniformity (NU) information, recovery coefficient (RC) information, and a spill over ratio (SOR) from the corrected data.

The optimal energy window determiner may calculate a figure of merit (FOM) based on the measured image quality, and may determine the optimal energy window based on the calculated FOM.

The optimal energy window determiner may calculate the FOM based on NU information, RC information, and an SOR measured from the corrected data by the image quality measurer.

Another embodiment provides a method of determining an optimal energy window in PET, the method including correcting, by a data corrector, data measured from an image quality phantom, measuring, by an image quality measurer, an image quality for the corrected data, and determining, by an optimal energy window determiner, the optimal energy window based on the measured image quality. The correcting of the measured data may include correcting the measured data based on a difference between sensitivities measured using different radiopharmaceuticals in at least one energy window.

The correcting of the measured data may include calculating a difference value between a first sensitivity measured using a first radiopharmaceutical and a second sensitivity measured using a second radiopharmaceutical, calculating a ratio of the first sensitivity to the calculated difference value, and correcting the measured data based on the calculated ratio.

The correcting of the measured data based on the calculated ratio may include correcting the measured data by subtracting, from the measured data, a value in which the calculated ratio is applied to a scatter component corresponding to the measured data.

The measuring of the image quality may include measuring at least one of NU information, RC information, and an SOR from the corrected data.

The determining of the optimal energy window determiner may include calculating a FOM based on the measured image quality, and determining the optimal energy window based on the calculated FOM.

The determining of the optimal energy window determiner may include calculating the FOM based on NU information, RC information, and an SOR measured from the corrected data.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which:

FIG. 2 is a table describing a single gamma photon fraction (SGF) according to an embodiment.

FIG. 10 is a table showing a figure of merit (FOM) calculated for each energy window.

DETAILED DESCRIPTION

Figure 1:
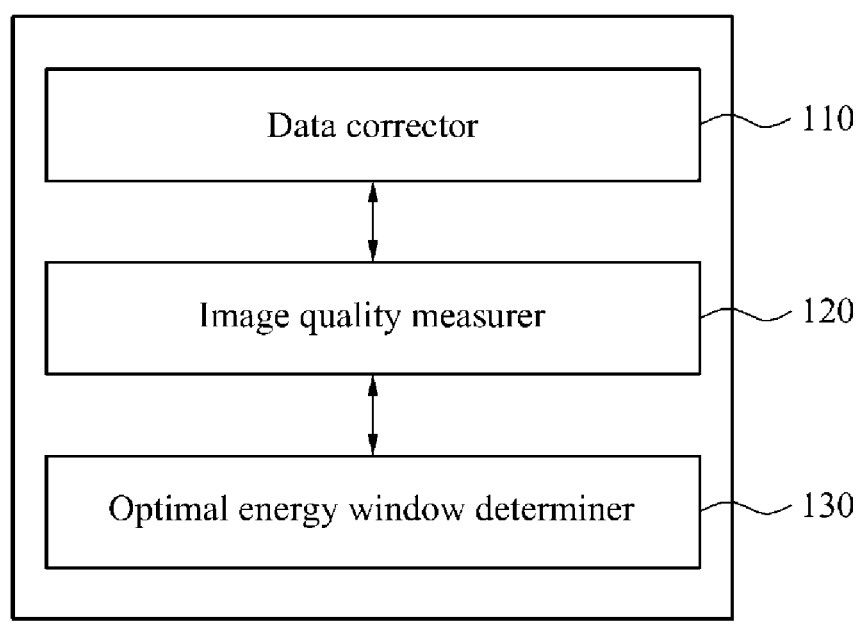
FIG. 1 is a block diagram illustrating an optimal energy window determining apparatus according to an embodiment.

Reference will now be made in detail to exemplary embodiments of the present invention, examples of which are illustrated in the accompanying drawings, wherein like reference numerals refer to like elements throughout. Exemplary embodiments are described below to explain the present invention by referring to the figures.

When it is determined detailed description related to a related known function or configuration they may make the purpose of the present invention unnecessarily ambiguous in describing the present invention, the detailed description will be omitted here. Also, terminologies used herein are defined to appropriately describe the exemplary embodiments of the present invention and thus, may be changed depending on a user, the intent of an operator, or a custom. Accordingly, the terminologies must be defined based on the following overall description of this specification.

FIG. 1 is a block diagram illustrating an optimal energy window determining apparatus 100 according to an embodiment.

The optimal energy window determining apparatus 100 may determine an optimal energy window for positron emission tomography (PET) through a data correction including a single gamma photon correction.

To this end, the optimal energy window determining apparatus 100 may include a data corrector 110, an image quality measurer 120, and an optimal energy window determiner 130.

Specifically, the data corrector 110 may correct data measured from an image quality phantom.

High-energy gamma photons may degrade an image quality. Single gamma photons that may be classified into the high-energy gamma photons may act as a background noise factor in reconfigured PET. Thus, the single gamma photons need to be corrected to enhance the image quality.

Data measured from the image quality phantom may include single gamma photons. Thus, the data corrector 110 may correct the measured data by correcting the single gamma photons.

The data corrector 110 may correct the measured data based on a difference between sensitivities measured using different radiopharmaceuticals in at least one energy window.

Specifically, to correct the measured data, the data corrector 110 may calculate a difference value between a first sensitivity measured using a first radiopharmaceutical and a second sensitivity measured using a second radiopharmaceutical. The data corrector 110 may calculate a ratio of the first sensitivity to the calculated difference value, and may correct the measured data based on the calculated ratio.

The calculated ratio may be defined as a single gamma photon fraction (SGF).

Radioactive isotopes such as C-11, N-13, O-15, F-18, and I-124 may be used as radiopharmaceuticals. An embodiment of correcting measured data using radiopharmaceuticals of F-18 and I-124 is described herein. However, it is only an example and thus, various radiopharmaceuticals may be used in addition to the radiopharmaceuticals of F-18 and I-124.

The data corrector 110 may use I-124 as the first radiopharmaceutical and may use F-18 as the second radiopharmaceutical.

More specifically, the data corrector 110 may calculate an SGF according to Equation 1.

$$SGF = \frac{^{124}Isensitivity - {^{18}Fsensitivity}}{^{124}Isensitivity} \quad \text{[Equation 1]}$$

In Equation 1, $^{124}$I sensitivity denotes the first sensitivity measured from the image quality phantom using the radiopharmaceutical of I-124, and $^{18}$F sensitivity denotes the second sensitivity measured from the image quality phantom using the radiopharmaceutical of F-18.

The SGF is further described with reference to FIG. 2.

FIG. 2 is a table 200 describing an SGF according to an embodiment.

The table 200 of FIG. 2 shows sensitivities measured in energy windows of 350 to 550, 350 to 600, 350 to 650, 350 to 750, 390 to 550, and 400 to 590 keV, which are different energy bands, and SGFs according thereto.

For example, SGFs may be calculated as expressed by Equation 2 by applying sensitivities measured in the energy band of 350 to 750 keV of the table 200. For reference, in the present embodiment, a first sensitivity is "9.83" measured using the radiopharmaceutical of I-124 in the energy band of 350 to 750 keV and a second sensitivity is "6.81" measured using the radiopharmaceutical of F-18 in the energy band of 350 to 750 keV.

$$SGF = \frac{9.83 - 6.81}{9.83} = 0.31 \quad \text{[Equation 2]}$$

Referring again to FIG. 2, the image quality measurer 120 may measure an image quality for the corrected data. Specifically, the image quality measurer 120 may measure at least one of non-uniformity (NU) information, recovery coefficient (RC) information, and a spill over ratio (SOR) from the corrected data.

The optimal energy window determiner 130 may determine the optimal energy window based on the measured image quality. For example, the optimal energy window determiner 130 may calculate a figure of merit (FOM) based on the NU information, the RC information, and the SOR measured from the corrected data, and may determine the optimal energy window based on the calculated FOM.

More specifically, the optimal energy window determiner 130 may calculate the FOM according to Equation 3.

$$FOM = \frac{\sqrt{f_{air} \cdot SOR_{air}^2 + f_{water} \cdot SOR_{water}^2} \times \frac{NU}{Sensitivity}}{\sqrt{RC_1^2 + RC_2^2 + RC_3^2 + RC_4^2 + RC_5^2}} \quad \text{[Equation 3]}$$

In Equation 3, NU denotes NU information measured from the corrected data and sensitivity denotes sensitivity information. Also, $SOR_{air}$ denotes RC information measured from the air and $SOR_{water}$ denotes RC information measured from the water, among a plurality of sets of RC information. In addition, $RC_1$ to $RC_5$ denote different sets of RC information measured from different energy windows, respectively.

For example, the optimal energy window determiner 130 may determine, as an optimal energy window band, an energy window band corresponding to a FOM having the smallest size among FOMs calculated in different energy windows.

Figure 3:
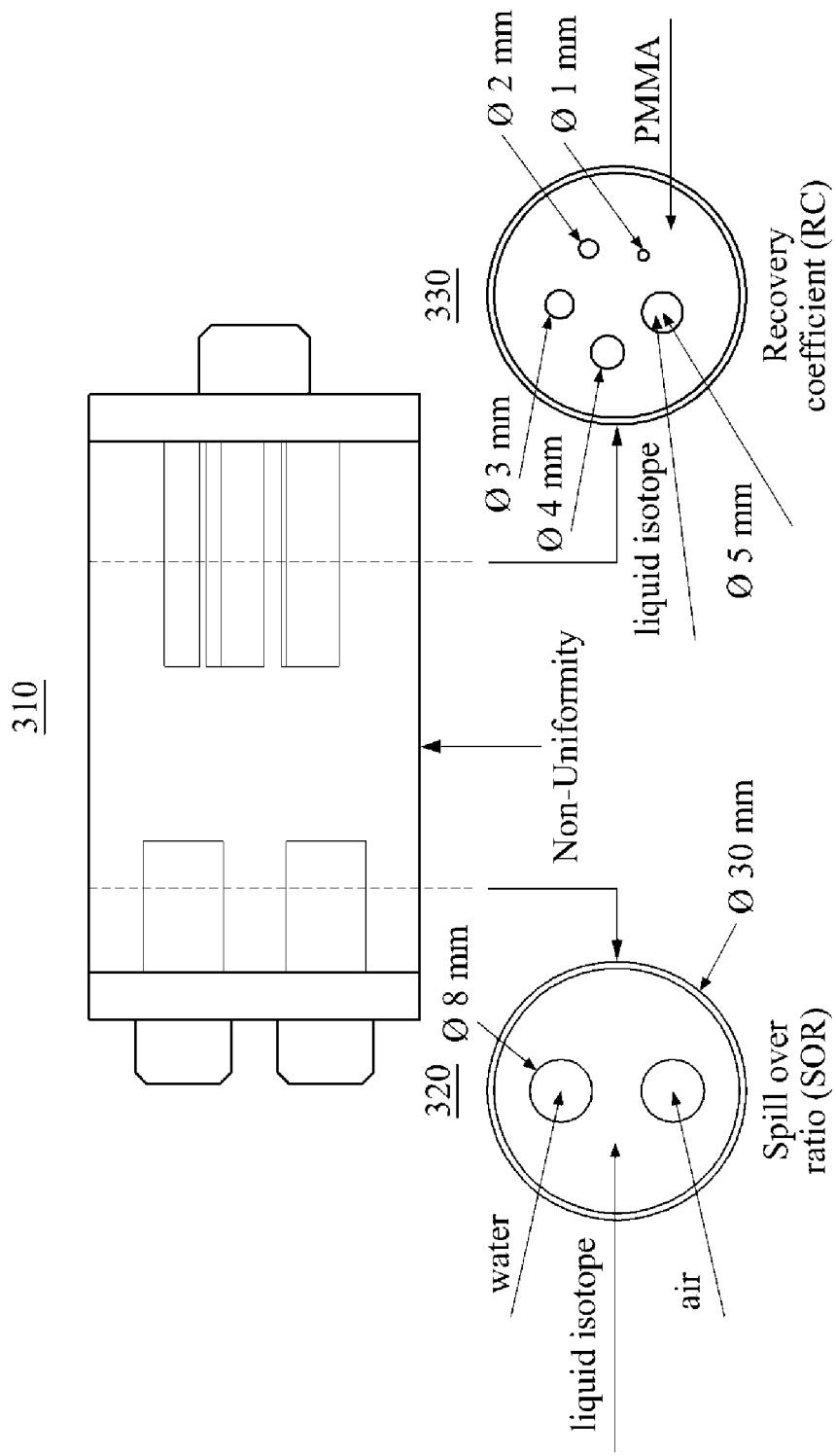
FIG. 3 is a diagram describing an image quality phantom according to an embodiment.

FIG. 3 is a diagram describing an image quality phantom 310 according to an embodiment.

The image quality phantom 310 may use F-18 and I-124 of 100 μCi as a source. Also, a scan time of I-124 may be set as 80 minutes, and a scan time of F-18 may be set as 20 minutes. Accordingly, the image quality phantom may obtain data in different energy windows, for example, 350 to 550, 350 to 600, 350 to 650, 350 to 750, 390 to 550, and 400 to 590 keV.

Also, an energy window-by-energy window SOR may be measured using materials, such as the water and the air, on one side 320 of the image quality phantom 310. Energy window-by-energy window RC information may be measured using holes having different apertures on another side 330 of the image quality phantom 310.

Figure 4A:
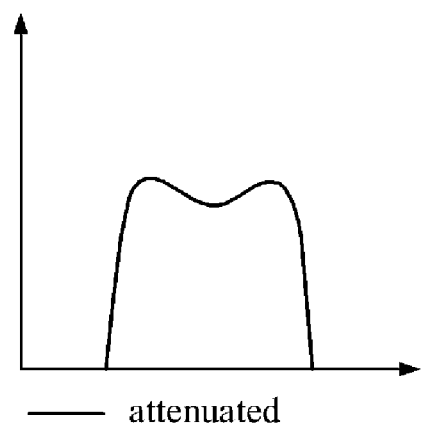
FIGS. 4A, 4B, and 4C are graphs describing an embodiment of performing a single gamma photon correction on data measured from an image quality phantom according to an embodiment.
Figure 4B:
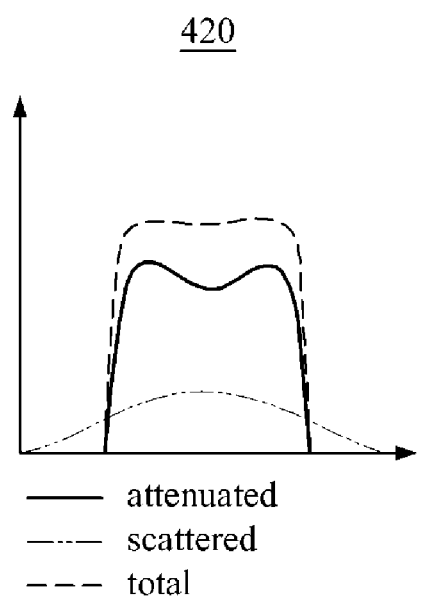
Figure 4C:
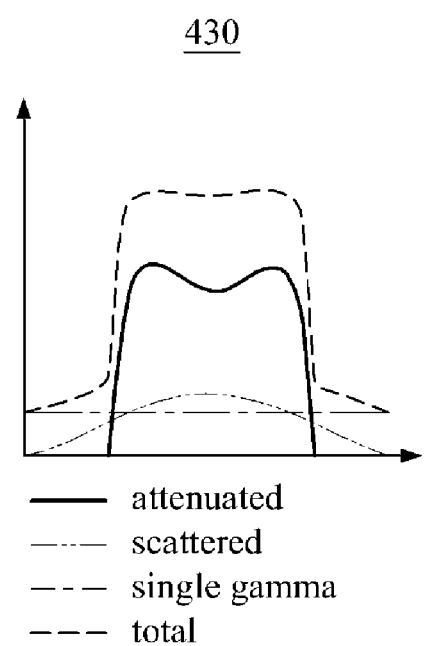

FIGS. 4A, 4B, and 4C are graphs 410, 420, and 430 describing an embodiment of performing a single gamma photon correction on data measured from an image quality phantom according to an embodiment.

The graph 410 of FIG. 4A shows a shape in which data measured from the image quality phantom is attenuated, and the graph 420 of FIG. 4B shows a shape in which the measured data is distorted due to attenuation and scattering. The graph 430 of FIG. 4C shows a single gamma photon formed based on the shape in which the measured data is attenuated and distorted.

Single gamma photons may act as a background noise factor in reconfigured PET. Accordingly, such single gamma photons need to be corrected to enhance the image quality.

Figure 5:
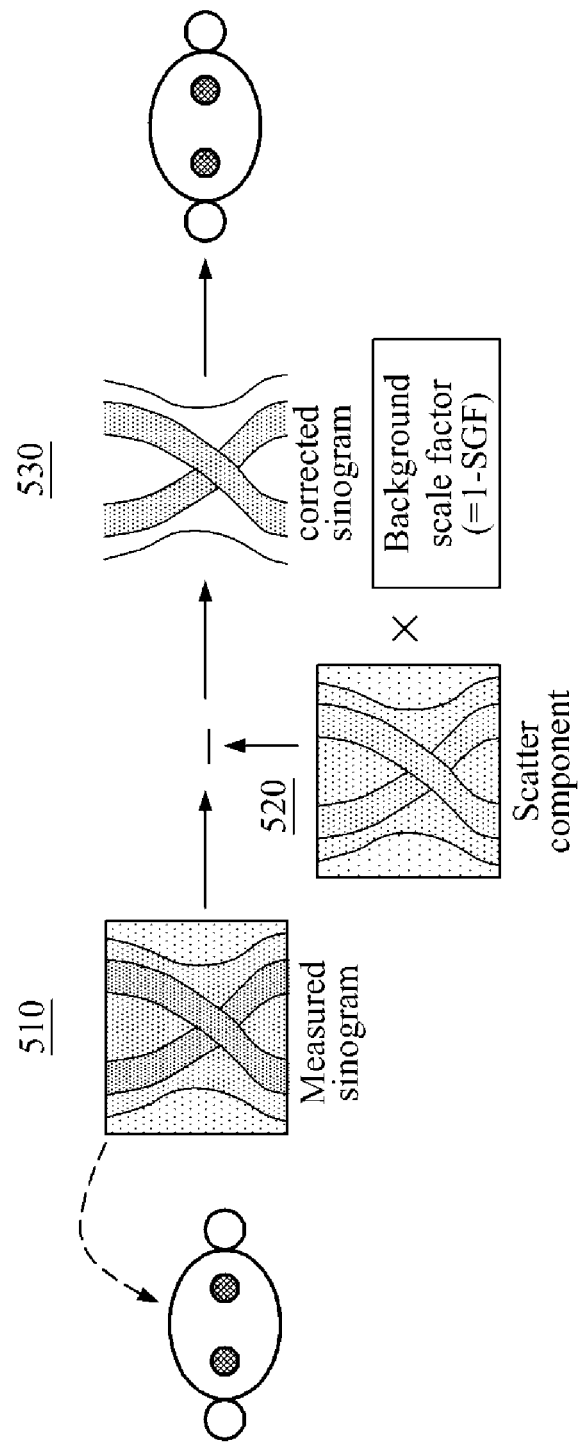
FIG. 5 illustrates an embodiment of correcting the single gamma photon of FIG. 4.

FIG. 5 illustrates an embodiment of correcting the single gamma photon of FIG. 4.

A data corrector according to an embodiment may correct the measured data by subtracting, from the measured data, a value in which the calculated ratio, that is, an SGF is applied to a scatter component corresponding to the measured data. A process of correcting the measured data by subtracting, from the measured data, the value in which the SGF is applied may be interpreted as a single gamma photon correction.

For example, to correct the single gamma photon, the data corrector may perform a correction by applying the calculated SGF to a measured sinogram 510. The measured sinogram 510 may be interpreted as information that is reconfigured from data measured from the image quality phantom.

To this end, the data corrector may calculate a corrected sinogram 530 with respect to the measured sinogram 510 according to Equation 4.

Corrected sonogram=measured sinogram−scatter component*background scale factor (=1−SGF)   [Equation 4]

For example, if SGF "0.31" calculated in the energy band of 350 to 750 keV is used, "1−0.31=0.69" may be applied to "scatter component" as "background scale factor" and a result of the applying may be subtracted from "measured sinogram". That is, if "scatter component*0.69" is subtracted from "measured sinogram", a result of the subtracting may be "corrected sinogram" in the energy window of 350 to 750 keV.

Figure 6:
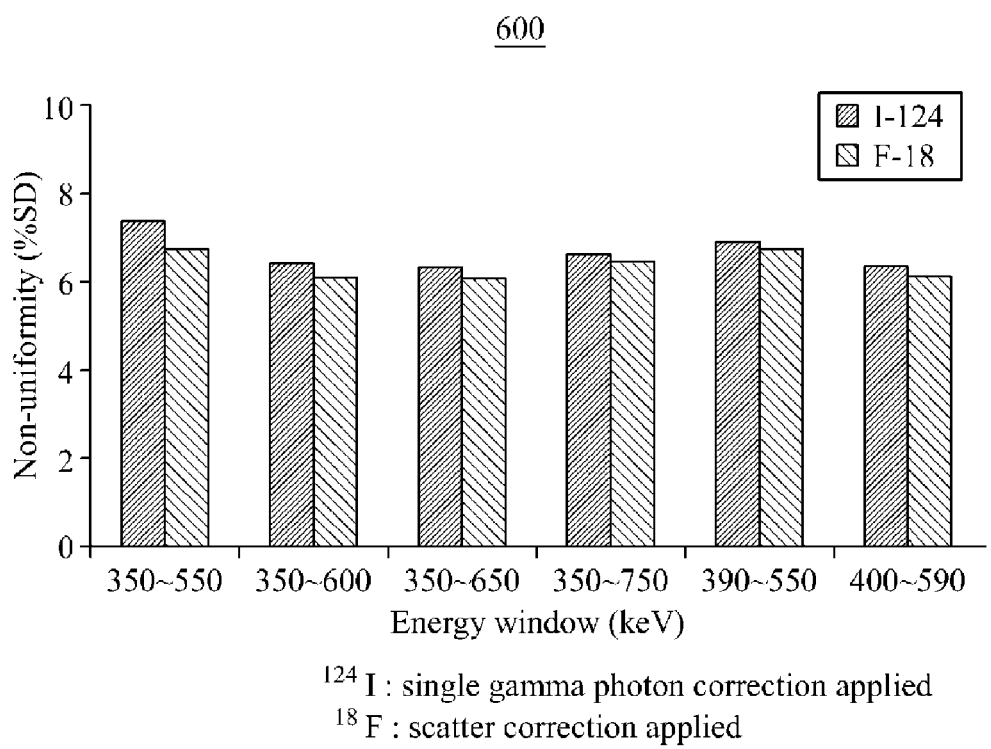
FIG. 6 is a graph describing non-uniformity (NU) information measured by an image quality measurer according to an embodiment.

FIG. 6 is a graph 600 describing NU information measured by an image quality measurer according to an embodiment.

The graph 600 shows NU information measured using I-124 and F-18 in energy windows of 350 to 550, 350 to 600, 350 to 650, 350 to 750, 390 to 550, and 400 to 590 keV, which are different energy bands.

The graph 600 shows NU information measured using I-124 and NU information measured using F-18. Here, the NU information measured using I-124 may be interpreted as information in which a single gamma photon correction is applied using an SGF. Also, the NU information measured using F-18 may be interpreted as information in which only a scatter correction is applied.

As shown in the graph 600, NU information between about 6.3% and about 7.3% may be measured.

Figure 7:
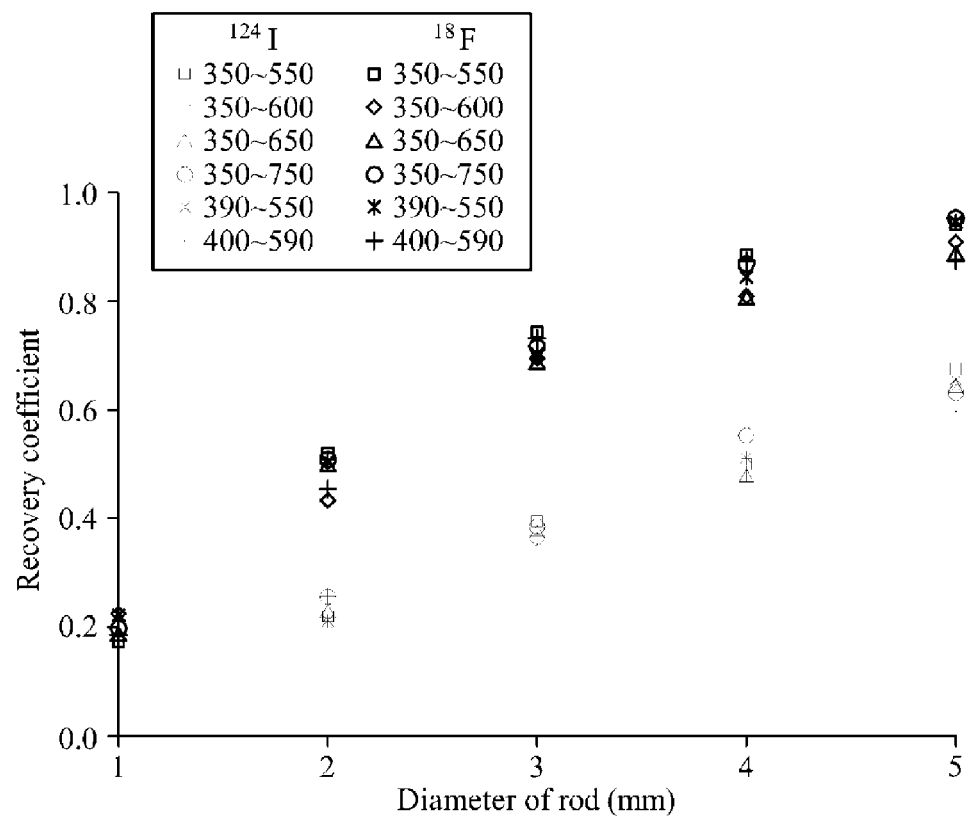
FIG. 7 is a graph describing recovery coefficient (RC) information measured by an image quality measurer according to an embodiment.

FIG. 7 is a graph 700 describing RC information measured by an image quality measurer according to an embodiment.

The image quality measurer according to an embodiment may measure different sets of RC information based on a diameter of an image quality phantom rod for each energy window. RC information may increase according to an increase in the diameter of the image quality phantom rod. However, a difference in RC information according to a difference in an energy window may be insignificant.

Figure 8A:
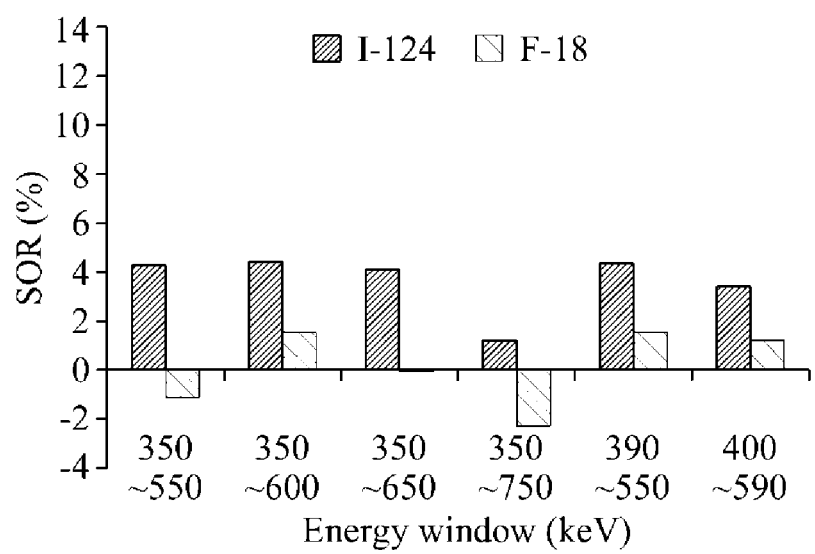
FIGS. 8A and 8B are graphs describing a spill over ratio (SOR) measured by an image quality measurer according to an embodiment.
Figure 8B:
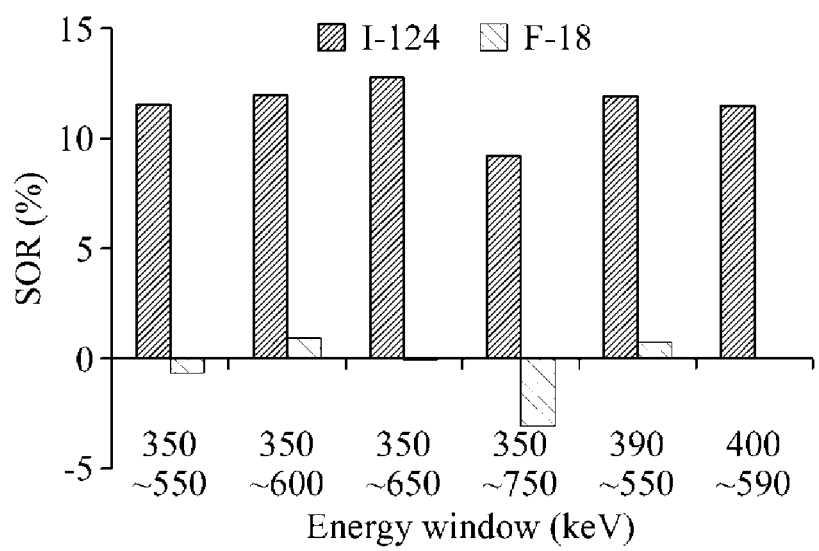

FIGS. 8A and 8B are graphs 810 and 820 describing an SOR measured by an image quality measurer according to an embodiment.

An SOR may be measured due to a material difference for rods disposed on the same side of an image quality phantom. The graph 810 shows an SOR with respect to the air for each energy window, and the graph 820 shows an SOR with respect to the water for each energy window. Also, each SOR may be measured from data of I-124 in which a single gamma correction is applied and data of F-18 in which a scatter correction is applied.

Figure 9:
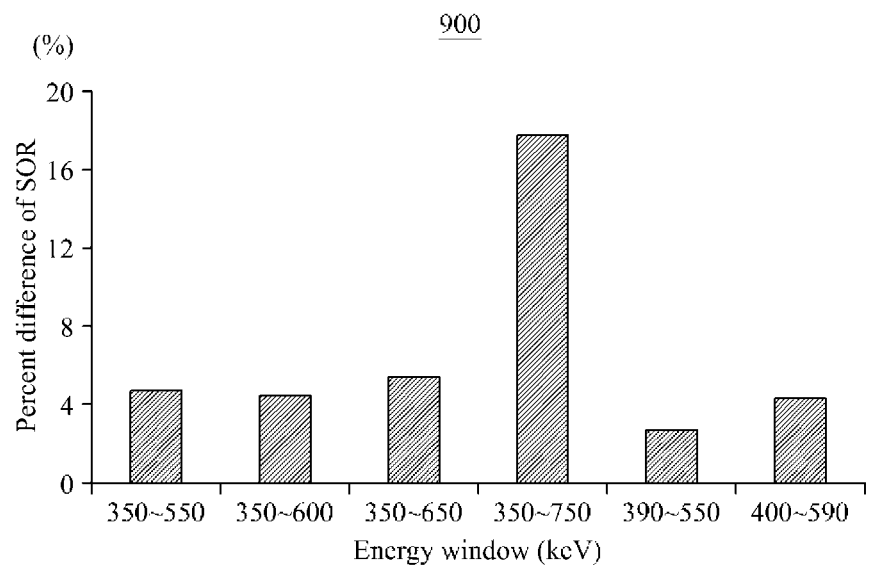
FIG. 9 is a graph showing a decrease ratio of an SOR after a single gamma photon correction is applied.

FIG. 9 is a graph 900 showing a decrease ratio of an SOR after a single gamma photon correction is applied.

A difference in an SOR may occur due to a single gamma photon correction.

Referring to the graph 900, an SOR after the single gamma photon correction is appeared was largest in the energy window of 350 to 750 keV and no significant difference in an SOR was found in remaining energy windows.

FIG. 10 is a table 1000 showing a FOM calculated for each energy window.

A box 1010 indicated by a dotted line represents FOMs in the energy window of, for example, 350 to 750 keV among energy windows.

Referring to the box 1010, an attenuation corrected (AC) FOM was calculated as "86.98" and an attenuation corrected and scatter corrected (AC&SC) FOM was calculated as "70.65" in the energy window of 350 to 750 keV. A single gamma photon corrected FOM in which an SGF is further applied to an attenuation correction and a scatter correction was calculated as "64.64", which is lowest among a total of FOMs in the table 1000.

Accordingly, the energy window of 350 to 750 keV may be determined as the optimal energy window.

For reference, an FOM in an energy window may be calculated according to Equation 3, which is described above with reference to FIG. 1.

Figure 11:
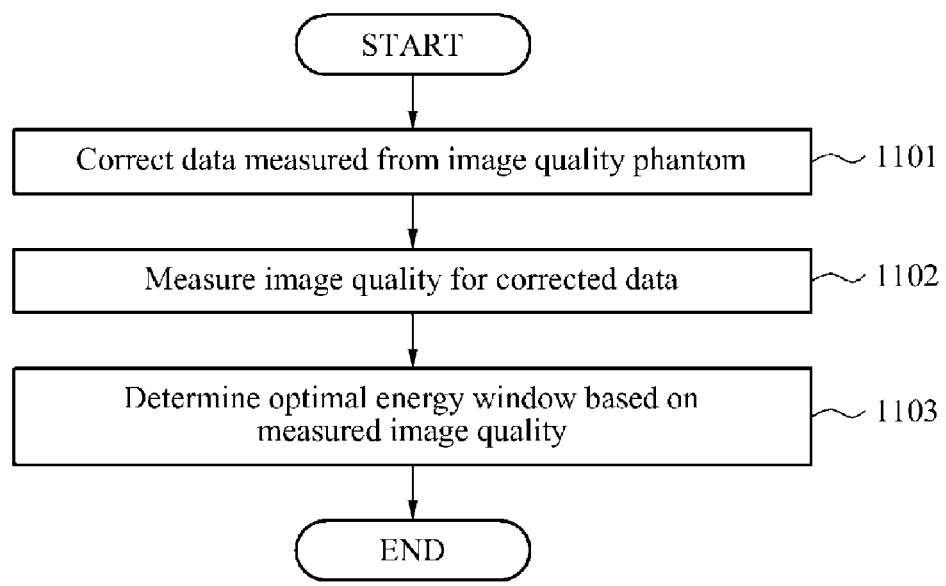
FIG. 11 is a flowchart illustrating an optimal energy window determining method according to an embodiment.

FIG. 11 is a flowchart illustrating an optimal energy window determining method according to an embodiment.

In operation 1101, the optimal energy window determining method may correct data measured from an image quality phantom. Specifically, the optimal energy window determining method may correct the data measured from the image quality phantom using a data corrector.

For example, the optimal energy window determining method may correct the measured data based on a difference between sensitivities measured using different radiopharmaceuticals in at least one energy window.

More specifically, the optimal energy window determining method may calculate a difference value between a first sensitivity measured using a first radiopharmaceutical and a second sensitivity measured using a second radiopharmaceutical. The optimal energy window determining method may calculate a ratio of the first sensitivity to the calculated difference value, and may correct the measured data based on the calculated ratio. As an example, the optimal energy window determining method may correct the measured data by subtracting, from the measured data, a value in which the calculated ratio is applied to a scatter component corresponding to the measured data.

In operation 1102, the optimal energy window determining method may measure an image quality for the corrected data. For example, the optimal energy window determining method may measure at least one of NU information, RC information, and an SOR from the corrected data.

In operation 1103, the optimal energy window determining method may determine an optimal energy window based on the measured image quality. The optimal energy window determining method may determine the optimal energy window based on the measured image quality using an optimal energy window determiner.

Specifically, the optimal energy window determining method may calculate a FOM based on NU information, RC information, and an SOR measured from the corrected data, and may determine the optimal energy window based on the calculated FOM.

The above-described exemplary embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An apparatus for determining an optimal energy window in positron emission tomography (PET), the apparatus comprising:
   a data corrector configured to correct data measured from an image quality phantom, wherein the measured data comprises a single gamma photon;
   an image quality measurer configured to measure an image quality for the corrected data; and
   an optimal energy window determiner configured to determine the optimal energy window based on the measured image quality,
   wherein the data corrector is configured to correct the measured data based on a difference between a first sensitivity of a first radiopharmaceutical and a second sensitivity of a second radiopharmaceutical in at least one energy window.

2. The apparatus of claim 1, wherein the data corrector is configured to correct the measured data based on a single gamma photon fraction (SGF), and wherein the SGF is calculated according to the following equation 1, $$SGF = \frac{\text{the first sensitivity} - \text{the second sensitivity}}{\text{the first sensitivity}}. \quad \text{[Equation 1]}$$

3. The apparatus of claim 2, wherein the data corrector is configured to correct the single gamma photon by calculating a corrected sonogram according to the following equation 2, Corrected sonogram=a measured sonogram−a scatter component×a background scale factor [Equation 2], and wherein the background scale factor is calculated according to the following equation 3

Background scale factor=1−SGF [Equation 3].

4. The apparatus of claim 1, wherein the image quality measurer is configured to measure at least one of non-uniformity (NU) information, recovery coefficient (RC) information, and a spill over ratio (SOR) from the corrected data.

5. The apparatus of claim 1, wherein the optimal energy window determiner is configured to calculate a figure of merit (FOM) based on the measured image quality, and to determine the optimal energy window having a smallest value of the FOM, wherein the FOM is calculated according to the following equation 4, $$FOM = \frac{\sqrt{f_{air} \times SOR_{air}^2 + f_{water} \times SOR_{water}^2} \times \frac{NU}{\text{Sensitivity}}}{\sqrt{RC_1^2 + RC_2^2 + RC_3^2 + RC_4^2 + RC_5^2}}, \quad \text{[Equation 4]}$$

wherein NU denotes non-uniformity information measured from the corrected data, wherein the sensitivity denotes sensitivity information of the corrected data, wherein a spill over ratio of air ($SOR_{air}$) denotes recovery coefficient (RC) information measured from air and a spill over ratio of water ($SOR_{water}$) denotes RC information measured from water among a plurality of sets of RC information, and wherein $RC_1$ to $RC_5$ denote different sets of RC information measured from different energy window.

6. The apparatus of claim 1, wherein the optimal energy window determiner is configured to calculate a figure of merit (FOM) based on non-uniformity (NU) information, recovery coefficient (RC) information, and a spill over ratio (SOR) measured from the corrected data by the image quality measurer.

7. A method of determining an optimal energy window in positron emission tomography (PET), the method comprising:
   correcting, by a data corrector, data measured from an image quality phantom, wherein the measured data comprises a single gamma photon;

measuring, by an image quality measurer, an image quality for the corrected data; and determining, by an optimal energy window determiner, the optimal energy window based on the measured image quality, wherein the correcting of the measured data comprises correcting the measured data based on a difference between a first sensitivity of a first radiopharmaceutical and a second sensitivity of a second radiopharmaceutical in at least one energy window.

8. The method of claim 7, wherein the correcting of the measured data comprises:

calculating the difference value between the first sensitivity measured using the first radiopharmaceutical and the second sensitivity measured using the second radiopharmaceutical; and calculating a single gamma photon fraction (SGF), wherein the SGF is calculated according to the following equation 1, $$SGF = \frac{\text{the first sensitivity} - \text{the second sensitivity}}{\text{the first sensitivity}}. \quad \text{[Equation 1]}$$

9. The method of claim 8, wherein the correcting of the measured data comprises correcting the single gamma photon by calculating a corrected sonogram according to the following equation 2, Corrected sonogram=a measured sonogram–a scatter component×a background scale factor  [Equation 2], and wherein the background scale factor is calculated according to the following equation 3

Background scale factor=1−SGF  [Equation 3].

10. The method of claim 7, wherein the measuring of the image quality comprises measuring at least one of non-uniformity (NU) information, recovery coefficient (RC) information, and a spill over ratio (SOR) from the corrected data.

11. The method of claim 7, wherein the determining of the optimal energy window determiner comprises:

calculating a figure of merit (FOM) based on the measured image quality; and determining the optimal energy window having a smallest value of the FOM, wherein the FOM is calculated according to the following equation 4, $$FOM = \frac{\sqrt{f_{air} \times SOR_{air}^2 + f_{water} \times SOR_{water}^2} \times \frac{NU}{\text{Sensitivity}}}{\sqrt{RC_1^2 + RC_2^2 + RC_3^2 + RC_4^2 + RC_5^2}}, \quad \text{[Equation 4]}$$

wherein NU denotes non-uniformity information measured from the corrected data, wherein the sensitivity denotes sensitivity information of the corrected data, wherein a spill over ratio of air ($SOR_{air}$) denotes recovery coefficient (RC) information measured from air and a spill over ratio of water ($SOR_{water}$) denotes RC information measured from water among a plurality of sets of RC information, and wherein $RC_1$ to $RC_5$ denote different sets of RC information measured from different energy window.

12. The method of claim 7, wherein the determining of the optimal energy window determiner comprises:

calculating a figure of merit (FOM) based on non-uniformity (NU) information, recovery coefficient (RC) information, and a spill over ratio (SOR) measured from the corrected data.

13. A non-transitory computer-readable recording medium storing a program to implement a method of determining an optimal energy window in positron emission tomography (PET), the method comprising:

correcting, by a data corrector, data measured from an image quality phantom, wherein the measured data comprises a single gamma photon;

measuring, by an image quality measurer, an image quality for the corrected data; and determining, by an optimal energy window determiner, the optimal energy window based on the measured image quality, wherein the correcting of the measured data comprises correcting the measured data based on a difference between a first sensitivity of a first radiopharmaceutical and a second sensitivity of a second radiopharmaceutical in at least one energy window.

\* \* \* \* \*